United States Patent
Dowiak et al.

(10) Patent No.: US 10,364,107 B2
(45) Date of Patent: Jul. 30, 2019

(54) TRUNNION ASSEMBLY FOR ROTARY DUMPER

(71) Applicant: Richmond Engineering Works L.L.C., Pittsburgh, PA (US)

(72) Inventors: Joseph L. Dowiak, Burgettstown, PA (US); R. Mark Judy, Richmond, OH (US); William K. McGowan, Houston, PA (US)

(73) Assignee: Richmond Engineering Works L.L.C., Pittsburgh, PA (US)

( * ) Notice: Subject to any disclaimer, the term of this patent is extended or adjusted under 35 U.S.C. 154(b) by 0 days.

(21) Appl. No.: 15/166,703

(22) Filed: May 27, 2016

(65) Prior Publication Data

US 2017/0341882 A1 Nov. 30, 2017

(51) Int. Cl.
  *B65G 67/50* (2006.01)
(52) U.S. Cl.
  CPC ........ *B65G 67/50* (2013.01); *B65G 2814/037* (2013.01)
(58) Field of Classification Search
  CPC ... B65G 67/42; B65G 67/50; B65G 2814/037
  USPC .................. 105/220; 414/359, 576
  See application file for complete search history.

(56) References Cited

U.S. PATENT DOCUMENTS

| | | | | |
|---|---|---|---|---|
| 52,949 | A * | 3/1866 | Babson | B61F 15/14 |
| | | | | 105/181 |
| 970,572 | A * | 9/1910 | Taylor | B66C 7/00 |
| | | | | 105/163.1 |
| 1,007,472 | A * | 10/1911 | McCauley | B61F 5/26 |
| | | | | 105/220 |
| 1,821,104 | A * | 9/1931 | McBride | B61F 5/52 |
| | | | | 105/207 |
| 3,373,829 | A | 3/1968 | Suman et al. | |
| 3,602,324 | A | 8/1971 | Cheek | |
| 3,622,021 | A | 11/1971 | Heath et al. | |
| 3,695,096 | A | 10/1972 | Kutsay | |
| 3,734,217 | A | 5/1973 | Flinth et al. | |
| 3,858,672 | A | 1/1975 | Mrozek et al. | |
| 4,024,962 | A | 5/1977 | Cheek et al. | |
| 4,043,467 | A | 8/1977 | Hand, Jr. | |
| 4,478,091 | A | 10/1984 | Forrester | |
| 4,609,321 | A * | 9/1986 | Binzen | B65G 67/50 |
| | | | | 414/291 |

(Continued)

OTHER PUBLICATIONS

European Search Report dated Nov. 16, 2011, in connection with Application No. EP11178164.

*Primary Examiner* — James Keenan
(74) *Attorney, Agent, or Firm* — Meunier Carlin & Curfman LLC

(57) ABSTRACT

A railcar dumper system utilizes a trunnion wheel assembly to support a rotary rail car dumper having a rotary frame assembly supported by at least four trunnion wheel assemblies positioned along the ends of the rotary frame assembly. Each trunnion wheel assembly includes an equalizer bracket and a pair of trunnion wheel units selectively connected and disconnected from opposite ends of the equalizer bracket. Each trunnion wheel unit has a respective trunnion wheel bracket supporting a respective trunnion wheel that rotates within the trunnion wheel bracket. An equalizer support pivotally connects to the equalizer bracket between the opposite ends.

19 Claims, 6 Drawing Sheets

(56) References Cited

U.S. PATENT DOCUMENTS

| | | | |
|---|---|---|---|
| 4,655,401 A | | 4/1987 | Binzen et al. |
| 4,685,851 A | | 8/1987 | Dowden |
| 4,878,551 A | | 11/1989 | Watkins et al. |
| 5,005,912 A | * | 4/1991 | Pipes ............... B66F 9/072 105/220 |
| 5,017,077 A | | 5/1991 | Dowden |
| 5,170,713 A | * | 12/1992 | Parewski ............ B60B 37/00 104/245 |
| 5,229,561 A | | 7/1993 | Ahl |
| 5,651,660 A | | 7/1997 | Dowden |
| 7,196,277 B1 | | 3/2007 | Santi |
| 2012/0048627 A1 | | 3/2012 | Insana et al. |

* cited by examiner

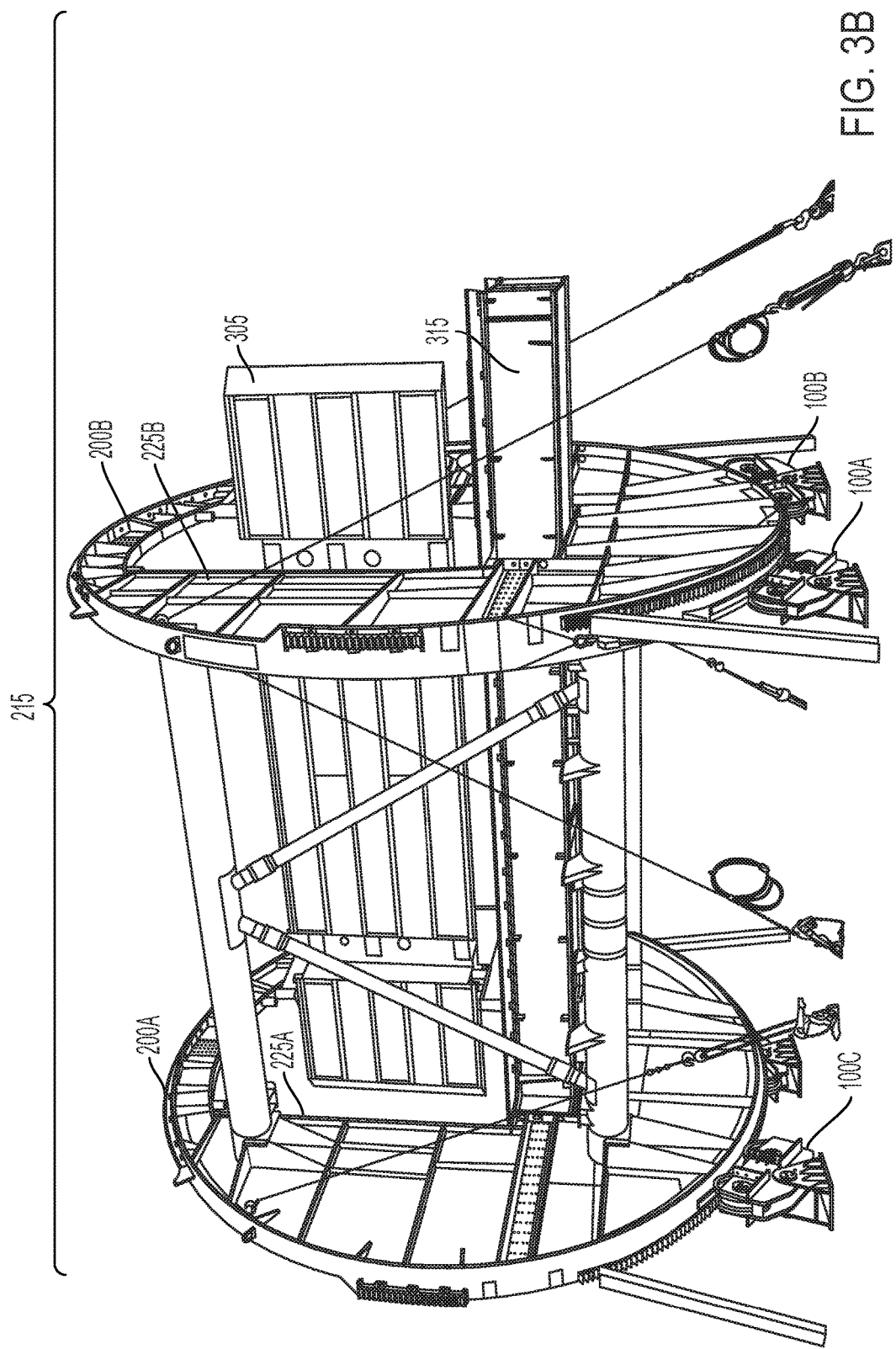

TRUNNION ASSEMBLY FOR ROTARY DUMPER

BACKGROUND

Current systems for depositing rail car loads include rotary frame assemblies that dump the contents of a rail car into a destination container by tipping the rail car over within a rotary frame securing the rail car. The rotary frame of the rail car assembly receives a rail car therein, and a power train connected to appropriate mechanical gearing and linkages turns the frame about a central frame axis to a pre-set angle of rotation sufficient to allow the contents of the rail car to exit from an opening in the rail car.

The rotary frame assembly in traditional rail car dumpers is an industrial strength frame assembly that outlines a shape and size sufficient to hold and turn an entire rail car of standard freight train dimensions. The significant weight and size of the rail car, along with the weight and size of the frame assembly itself, requires detailed structural engineering to ensure proper support, safety, and durability. One kind of component that is particularly subject to stress in a rotary rail car dumper assembly is the base arrangement that essentially supports the entire assembly and enables the whole operation of maintaining a rail car above ground in a position for rotating the frame and dumping the contents of the rail car.

Along the base region of a traditional rotary dumper frame assembly, the frame assembly utilizes trunnions that support each end of the frame assembly. The trunnions are configured to support and turn the rotary frame assembly about the central axis of the frame assembly. Generally, the trunnions raise the rotary frame assembly off the ground and providing rotary components that engage the rotary frame assembly so that the frame assembly turns, about a central axis, along the trunnions. In this way, the intense weight of the frame assembly, with and without a rail car therein, rests on the rotors of a set of trunnions positioned under support positions in the rotary frame assembly. Typically, four trunnions support the rotary frame assembly and allow for the frame assembly to rotate thereon.

In traditional rotary frame assemblies, the rotor of the trunnion is a trunnion wheel, or even a pair of trunnion wheels, that mates or at least contacts, with a portion of the frame assembly. The trunnion wheels allow the frame assembly to rotate along the intersection of the trunnion wheels and those portions of the frame assembly mating with each trunnion wheel. In this way, the drive train of the frame assembly imparts rotary motion to the frame assembly, and the frame assembly is free to rotate along the trunnion wheels that provide not only support for the weight but corresponding rotary motion at the same time.

As noted above, the extreme weight and the mechanical stress of rotary motion lead to numerous issues in regard to maintenance of the rotary frame assembly and the trunnion wheels. To date, the trunnion wheels require the whole trunnion assembly to be dismantled in the event that the trunnion wheel needs to be replaced. Accordingly, the trunnion for a rotary frame must be taken out of commission and the trunnion wheel removed for repair by extracting the wheel pin and the entire wheel assembly. Accordingly, a need exists in the art of rotary rail car dumpers for an apparatus, a method, and a system that accommodates a quick change rotary rail car dumper assembly.

BRIEF SUMMARY OF THE DISCLOSURE

In one embodiment, a trunnion wheel assembly includes an equalizer bracket and a trunnion wheel unit with a trunnion wheel bracket supporting a trunnion wheel that rotates within the trunnion wheel bracket. The trunnion wheel unit is configured to be selectively connected and disconnected from the equalizer bracket.

In another embodiment, the trunnion wheel assembly includes an equalizer bracket and a trunnion wheel bracket defining a wheel pin passageway there through, wherein the trunnion wheel bracket is configured to selectively connect and disconnect from said equalizer bracket. In a connected position, the equalizer bracket and the trunnion wheel bracket define a trunnion wheel cavity therein.

In yet another embodiment, a railcar dumper system utilizes the trunnion wheel assembly to support a rotary rail car dumper supported by at least four trunnion wheel assemblies, each trunnion wheel assembly having an equalizer bracket and a pair of trunnion wheel units selectively connected and disconnected from opposite ends of the equalizer bracket. Each trunnion wheel unit comprises a respective trunnion wheel bracket supporting a respective trunnion wheel that rotates within the trunnion wheel bracket. An equalizer support pivotally connects to the equalizer bracket between the opposite ends.

Additionally, in a method of connecting a trunnion wheel within a trunnion wheel assembly, the method includes assembling a trunnion wheel unit by securing the trunnion wheel within a trunnion wheel bracket such that the trunnion wheel rotates about a wheel pin connected across the trunnion wheel bracket, securing the trunnion wheel unit to an equalizer bracket on the trunnion wheel assembly such that the trunnion wheel rotates about the wheel pin within a trunnion wheel cavity defined by the trunnion wheel bracket and the equalizer bracket, wherein the trunnion wheel unit is configured to be selectively connected and disconnected from the equalizer bracket.

BRIEF DESCRIPTION OF SEVERAL VIEWS OF THE DRAWINGS

FIG. 3B is a side elevation view of a rotary frame assembly utilizing a trunnion wheel assembly with two trunnion wheels as disclosed herein.

DETAILED DESCRIPTION

Figure 1:
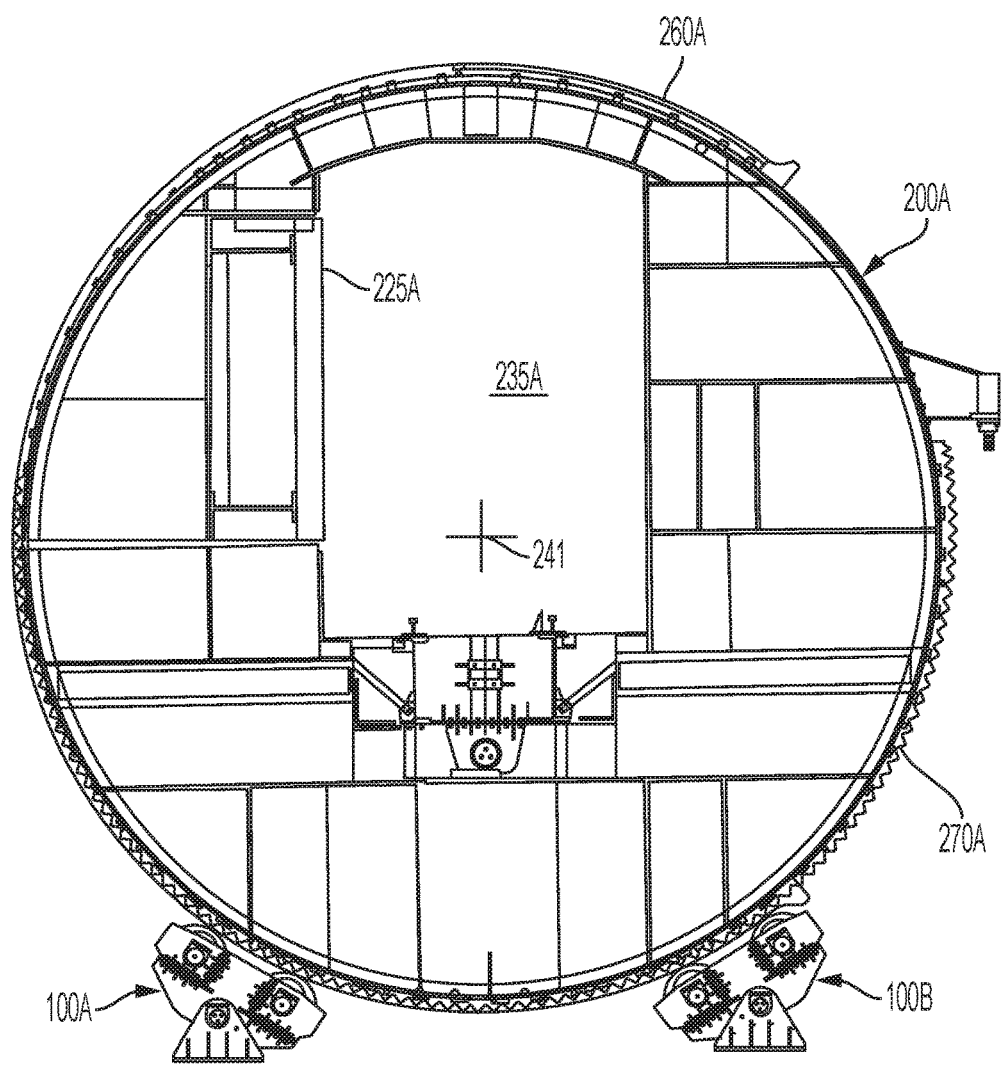
FIG. 1 is an end elevation view of one end of a rotary frame assembly as disclosed herein.

As shown in the FIGS. 1-4, a rotary rail car dumper according to one aspect of this disclosure includes a rotary frame assembly (215) extending between two ends (200A, 200B) that are generally parallel and configured for turning in an arcuate motion about a central axis (241) extending between the ends (200A, 200B). Without limiting the invention to any one embodiment, FIGS. 1-4 illustrate that the ends (200A, 200B) may be generally circular in shape so that the rotary frame assembly (215) can be supported by a set of trunnions (99, 100) and rotate about the frame assembly central axis (241) on the trunnions (99, 100). The trunnions (99, 100) supporting the rotary frame assembly (215) include respective trunnion wheels (10) that engage the ends (200A, 200B) of the rotary frame assembly (215) to accommodate not only a weight supporting function about the base of the rotary frame assembly, but also, the trunnions (100) fill a rotary bearing role so that the ends (200A, 200B) turn in conjunction with the turning trunnion wheels (10). As shown in FIGS. 1 and 2, the rotary frame assembly (215) and the trunnion wheels (10) each turn about respective central axes (141, 241) that are substantially parallel.

Figure 3A:
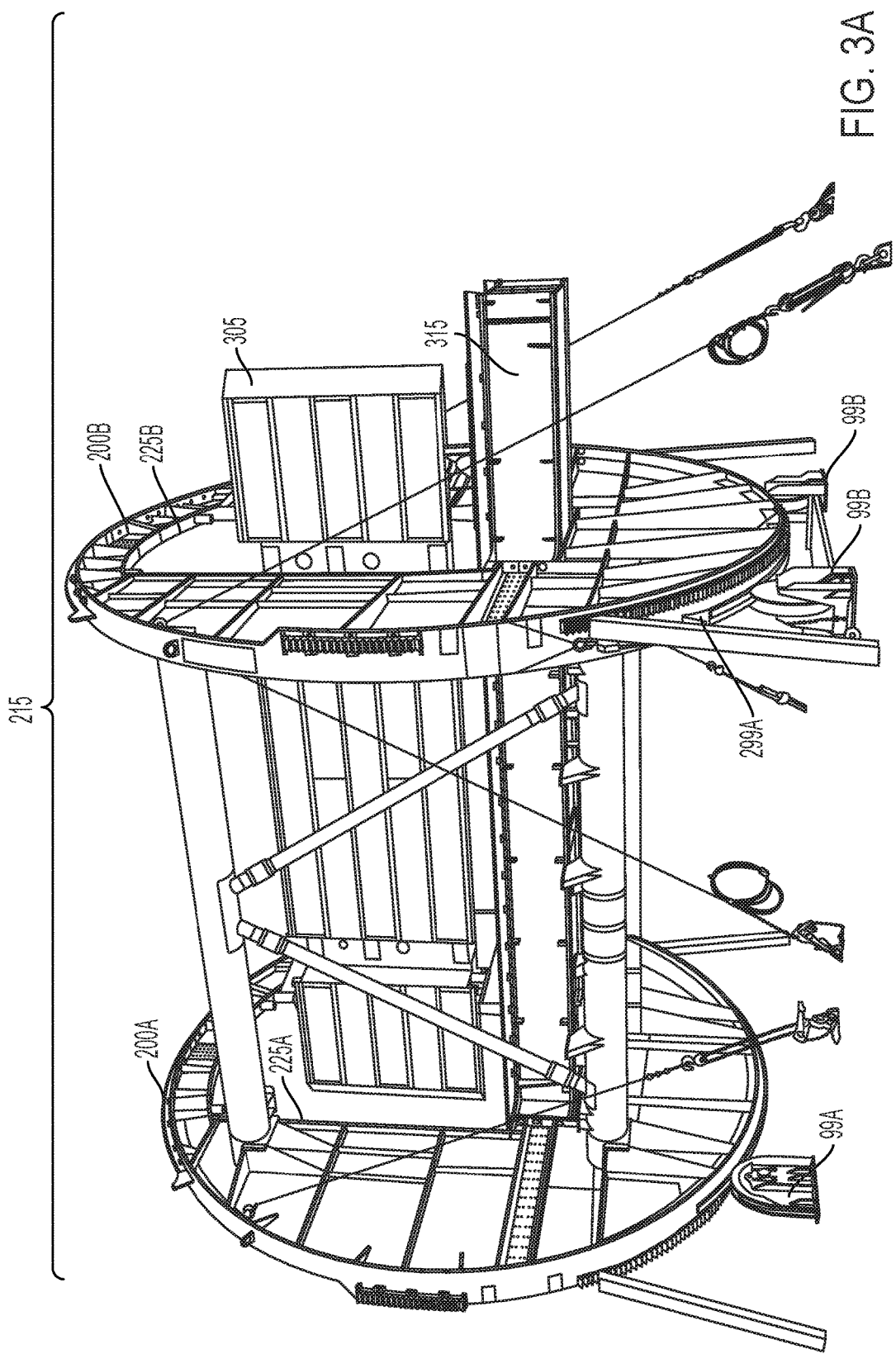
FIG. 3A is a side elevation view of a rotary frame assembly supported by a trunnion wheel assembly with one trunnion wheel as disclosed herein.
Figure 4:
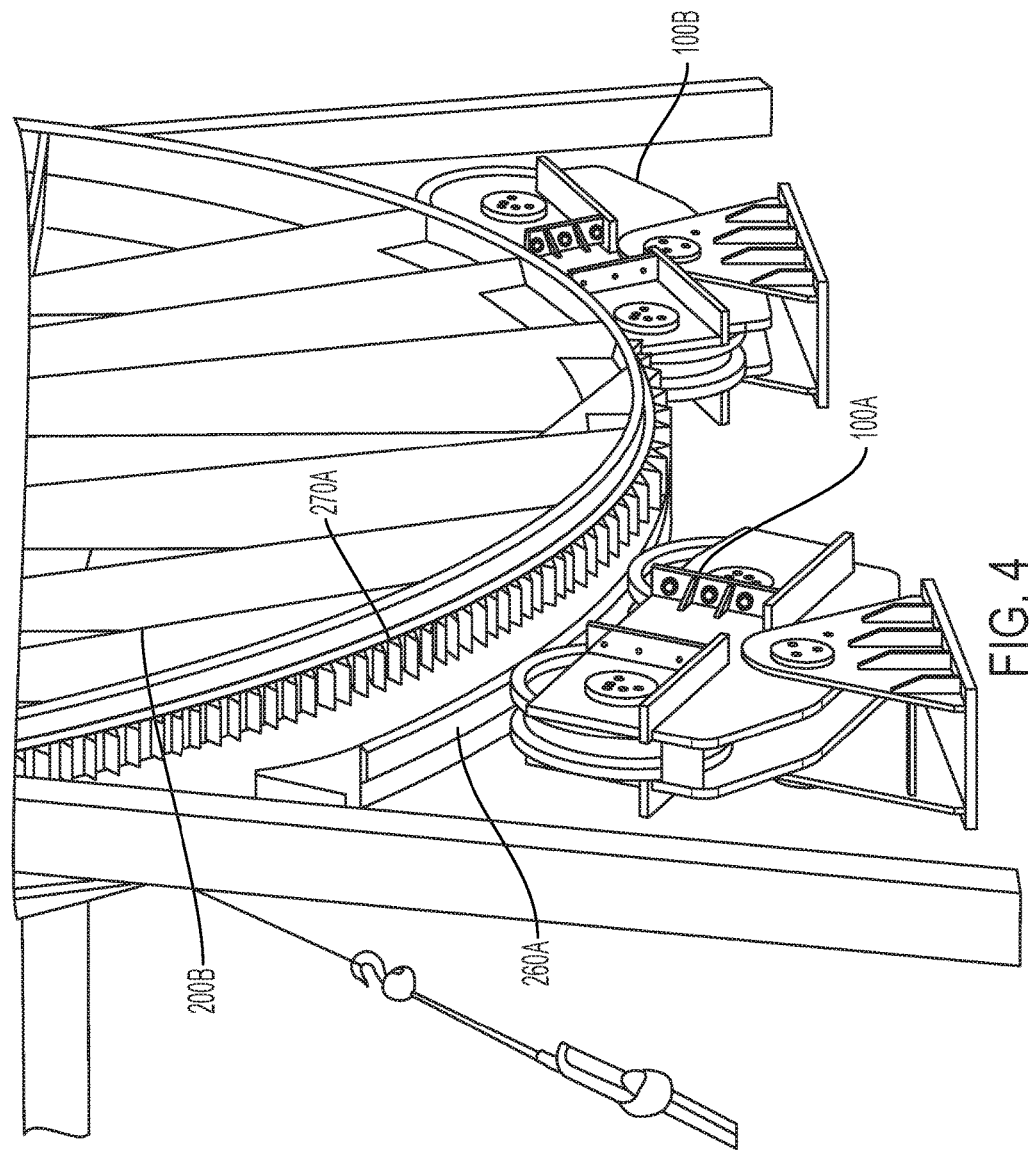
FIG. 4 is a side perspective view of one end of a rotary frame assembly supported on opposite sides by a trunnion wheel assembly having two wheels engaging a track on the frame assembly.

FIGS. 3 and 4 show the overall environment for the rotary rail car dumper frame assembly (215) implemented with trunnion wheel assemblies (99, 100) at each end (200). FIG. 3A illustrates that during an assembly and construction phase for a rotary frame assembly (215), the frame assembly may incorporate single wheel trunnions (99) to lift and support the rotary frame assembly (215). A final assembly of the rotary rail car dumper, as shown in FIG. 3B, however, often utilizes trunnion wheel assemblies (100) that incorporate respective pairs of trunnion wheels (10A, 10B) positioned such that each trunnion wheel (10A, 10B) in each pair engages respective regions along each end (200A, 200B) of the rotary frame assembly (215).

In one embodiment, the trunnion wheel assemblies (100), positioned at respective load bearing points along the rotary frame assembly (215), are mobile assemblies that can be interchanged as necessary for repair or maintenance. Other embodiments may connect the trunnion wheel assemblies (100) to the rotary frame assembly (215) as necessary to implement a rotary rail car dumper in a particular environment.

Without limiting the kinds of rotary rail car dumpers that may utilize the respectively disclosed trunnion wheel assemblies (99, 100) and rotary frame assembly (215) shown here, certain aspects of the rotary frame assembly (215) are referenced and described for purposes of a complete disclosure. As discussed above and shown in FIGS. 2-4, a rotary rail car dumper may incorporate a rotary frame assembly (215) that provides a rail car passageway between opposite ends (200A, 200B). A rail car (not shown but typically sized for freight) fits onto a platen (315) alongside or against a spill wall (305). The rail car, positioned for dumping via the rotary frame assembly (215), would extend between respectively defined rail car openings (225A, 225B) of each end (200A, 200B) of the rotary frame assembly (215).

As shown in FIG. 4, one embodiment of a final installation of the rotary frame assembly (215) includes a respective end (200B) supported by two dual wheel trunnion wheel assemblies (100A, 100B) as disclosed herein. Each trunnion wheel assembly (100A, 100B) is positioned on a static surface, such as the ground, and engages the end (200B) of the rotary frame assembly (215) at defined regions of the end (200B). In one non-limiting example, the rotary frame assembly (215) includes end ring rail (260A, 260B) and a tooth gear (270A, 270B) operatively connected to respective ends (200A, 200B) of the rotary frame assembly (215). Without limiting the scope of this disclosure, the end ring rail (260A, 260B) is configured to engage both of the trunnion wheels (10A, 10B) in single trunnion wheel assembly (100A, 100B) to allow for the rotary frame assembly (215) to complete controlled arcuate motion along the end ring rail (260A, 260B) via the trunnion wheel assemblies (100). The extent to which the end ring rail (260A, 260B, 299A, 299B) extends around a respective end (200A, 200B) determines the range of motion through which the rotary frame assembly (215) can rotate. The end ring rail (260, 299) may extend all the way around the end (200) of the rotary frame assembly (215), or the end ring rail (260) may extend along an edge, preferably an inner edge, of the end (200) at points that are between 45 degrees and 135 degrees around the circumference of the end (200), when the central axis (241) is considered to define a point of origin in Cartesian coordinates on the respective end (200). In such a Cartesian coordinate system, the trunnion wheel assemblies (100) would be positioned in the third and fourth quadrants with respect to the origin (i.e., at points near 240 degrees and 300 degrees approximately). The tooth gear (270) is also shown in the figures to provide a full disclosure of the connection to a power train that imparts the rotary dumping motion to the frame assembly (215).

Figure 2A:
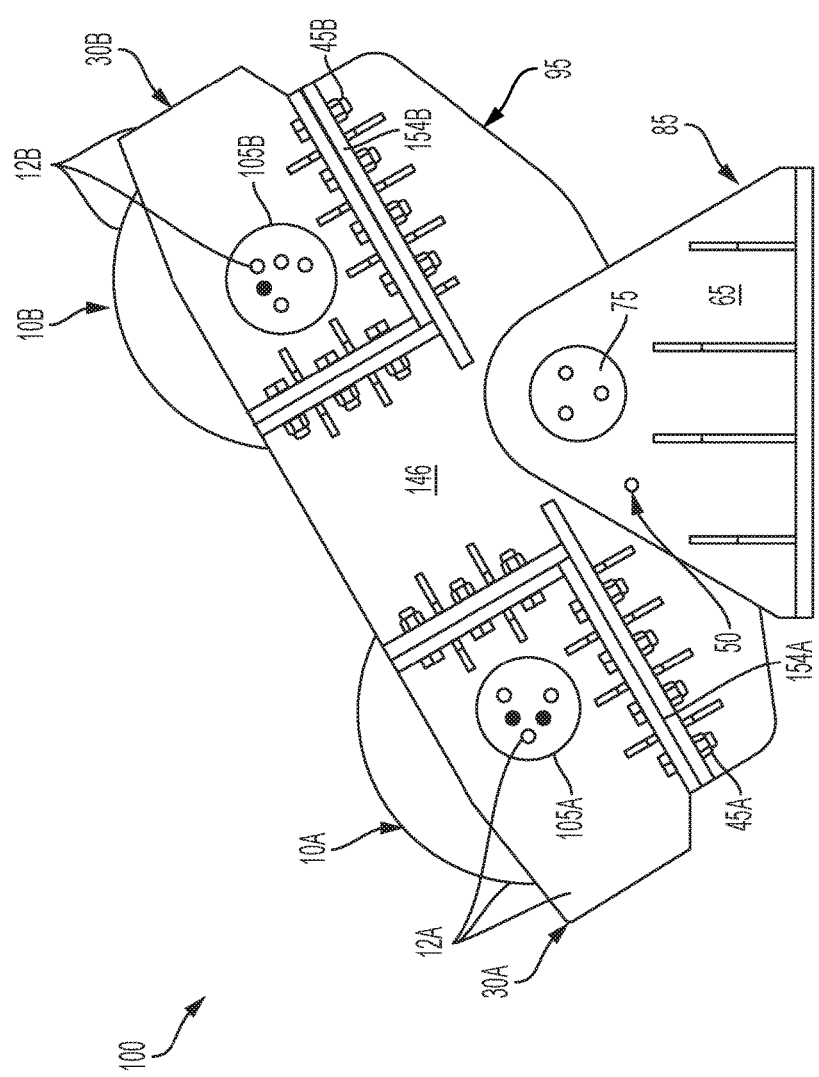
FIG. 2A is an elevation view of a trunnion wheel assembly as disclosed herein.
Figure 2B:
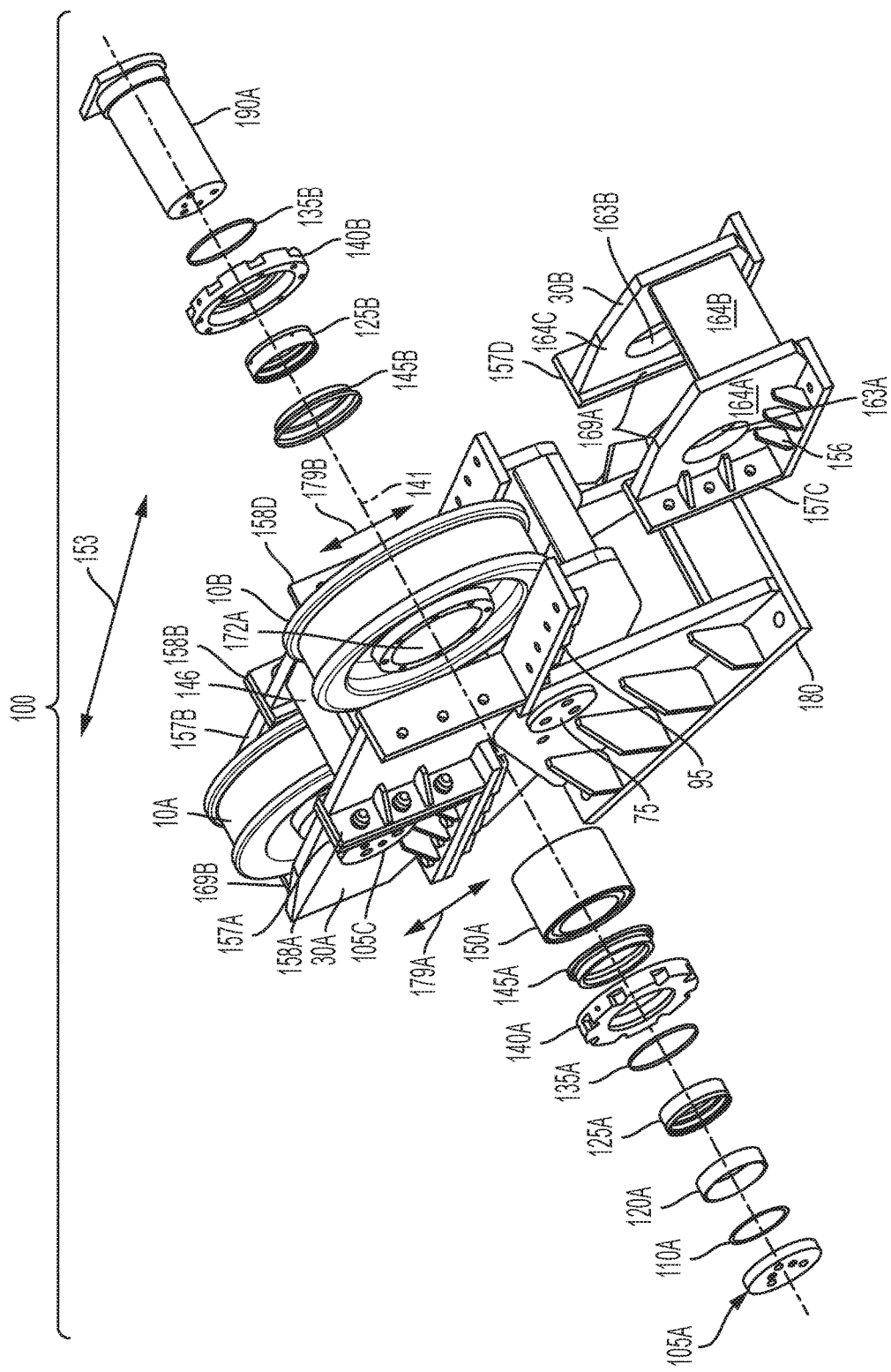
FIG. 2B is an exploded perspective view of the trunnion wheel assembly of FIG. 2A.

FIGS. 2A and 2B illustrate the trunnion wheel assembly (100) that is disclosed in one embodiment as providing a convenient and fast mechanism for switching out trunnion wheels (10A, 10B) that engage the frame assembly (215). Each trunnion wheel assembly (100) includes an overall equalizer bracket (95) that mounts via a pivot mechanism (75) to allow for a general rocking or radial motion across the pivot mechanism (75) such that opposite ends of the equalizer bracket (95) have a defined range of angular motion about the central axis of the pivot mechanism (75). The equalizer bracket (95) mounts to an equalizer support (85) via the pivot mechanism (75) extending through corresponding openings in the respective faces (65) of the support bracket (85) and the equalizer bracket (95). In another embodiment, the equalizer bracket may be configured as a jack that imparts sufficient leverage to lift one of the end rings of the frame assembly.

The equalizer bracket (95) may be composed of numerous faces connected together and supported by gussets to define a generalized opening or cradle (153) between the faces as shown in FIG. 2B. The cradle (153) defined by the equalizer bracket (95) may include a divider (146) that incorporates an overall "upside-down T" shape to the equalizer bracket (95) and defines two side-by-side sections (154A, 154B) within the cradle of the equalizer bracket. Each section of the equalizer bracket (95) is configured to hold a respective trunnion wheel unit (12A, 12B) at the opposite ends of the equalizer bracket (95).

The trunnion wheel unit (12A, 12B) described herein presents a marked difference in the realm of trunnion wheel assemblies used prior to this disclosure. Each trunnion wheel unit (12A, 12B) of FIG. 2A and FIG. 2B includes a trunnion wheel bracket (30A, 30B) that connects and holds a respective trunnion wheel (10A, 10B) therein. The trunnion wheel unit (12A, 12B), incorporating at least the trunnion wheel bracket (30A, 30B) holding a respective trunnion wheel (10A, 10B), is entirely removable from the equalizer bracket (95) without disassembling the wheel and its associated wheel pin (190). In other words, the trunnion wheel unit (12A, 12B) is a modular component relative to the overall trunnion wheel assembly (100) and the equalizer bracket (95) in particular. As shown most clearly in FIG. 2B, the trunnion wheel bracket (30A, 30B) is removable from either end of the equalizer bracket (95). The trunnion wheel units (12A, 12B) are independent components with respect to each other, the equalizer bracket (95), and the overall trunnion wheel assembly (100). Upon removing either of the trunnion wheel units (12A, 12B) from the trunnion wheel assembly (100), the respective trunnion wheel unit can be disassembled in a different location after moving the trunnion wheel unit, which is often portable, to a maintenance facility. One embodiment exemplified in FIGS. 2A and 2B, therefore, encompasses the concept of configuring the equalizer bracket (95) with a bifurcated cradle, defining a clearing space within the structure of the equalizer bracket, that allows for trunnion wheels (10A, 10B) to extend into the cradle of the equalizer bracket (95), but each trunnion wheel (10A, 10B) is separately supported by a removable trunnion wheel bracket (30A, 30B). Each trunnion wheel bracket (30A, 30B) is separately connected to the equalizer bracket (95). The result is a trunnion wheel unit (12A, 12B) that is part of a modular assembly that allows for a single trunnion wheel (10A, 10B) to be removed from the equalizer bracket (95) without removing the wheel pin and associate axle parts of the trunnion wheel (10A, 10B) and without disassembling the other trunnion wheel unit. In this way, the trunnion wheel unit (12A, 12B) is configured to be selectively connected and disconnected from the equalizer bracket.

Each trunnion wheel unit (12A, 12B), therefore, incorporates a trunnion wheel (10A, 10B) for engaging the rotary frame assembly (215) as described previously herein. The trunnion wheels typically include a respective wheel pin (190A, 190B) that is coaxial with each trunnion wheel (10A, 10B) and secured across a respective trunnion wheel bracket (95) such that the trunnion wheel rotates within the trunnion wheel bracket (30A, 30B) and about the wheel pin (190). Standard bearing assemblies with wheel pin end plate (105), gaskets (110), seal rings (120), seal spacers (125), O-rings (135), bearing and seal retainers (140), bearing seal rings (145), and roller bearings (150) are shown in FIG. 2B accordingly and have coaxial relationships with the wheel and the trunnion wheel bracket. Bores (163) in opposite faces (164A, 164C) of the trunnion wheel bracket (30) define a trunnion wheel pin passageway through which the wheel pin assembly of FIG. 2B connects the trunnion wheel (10) to the trunnion wheel bracket (30).

The equalizer bracket (95), configured for tilting up and down across a pivot mechanism (75), defines first and second mating surfaces (158A-D) on respective ends of the equalizer bracket (95) and on respective sides of the divider (146) separating the opposite portions of the equalizer cradle. In a companion fashion, the trunnion wheel bracket (30A, 30B) defines corresponding mating surfaces (157A-D). In one nonlimiting example shown in FIG. 2B, the first and second mating surfaces and the corresponding mating surfaces are simple angled edges. The figures show the equalizer bracket (95) and the trunnion wheel bracket (30) each configured for right angled mating surfaces, but other shapes for the mating surfaces are clearly within the scope of this disclosure. The mating surfaces may define openings for fasteners such as bolts (45A, 45B) connecting the trunnion wheel bracket (30) to the equalizer bracket (95).

As noted above and shown in FIGS. 2A and 2B, in one embodiment, the equalizer bracket (95) defines at least one clearing space, or cradle (153), that is bifurcated to define opposite sections (154A, 154B) to hold respective wheels (10). Each section of the equalizer bracket defines a respective first mating surface (158A, 158C) and a second mating surface (158B, 158D) to receive first corresponding mating surfaces (157A, 157C) and a second corresponding mating surfaces (157B, 157D) on the respective trunnion wheel brackets (30). The mating surfaces selectively connect and disconnect from each other. In a connected position, the equalizer bracket (95) and the trunnion wheel bracket (30) define a trunnion wheel cavity within a section (154) of the equalizer bracket. The trunnion wheel cavity combines respective clearing spaces (153, 169) in the equalizer bracket (95) and the trunnion wheel bracket (30). Upon removing a trunnion wheel unit (12) independently of the other components in the trunnion wheel assembly (100), the trunnion wheel (10) remains disposed in only the clearing space of the trunnion wheel bracket (30).

The trunnion wheel assembly (100) allows for the rotary frame assembly (215) to be supported and rotated along a set of trunnion wheel assemblies supporting the rotary frame assembly. In the examples shown in the figures, a rotary dumper system includes a rotary rail car dumper with a rotary frame assembly (215) supported by at least four trunnion wheel assemblies (100), each trunnion wheel assembly including an equalizer bracket (95) and a pair of trunnion wheel units (12) selectively connected and disconnected from opposite ends of the equalizer bracket (95), wherein each trunnion wheel unit comprises a respective trunnion wheel bracket (30) supporting a respective trunnion wheel (10) that rotates within the trunnion wheel bracket. An equalizer support pivotally connects to the equalizer bracket (95) between opposite ends of the equalizer bracket, as described herein.

The components are configured for use in a method of connecting a trunnion wheel within a trunnion wheel assembly, the method including assembling a trunnion wheel unit (12) by securing the trunnion wheel (10) within a trunnion wheel bracket (30) such that the trunnion wheel rotates about a wheel pin (190) connected across the trunnion wheel bracket. Securing the trunnion wheel unit (12) to an equalizer bracket on the trunnion wheel assembly (100) allows the trunnion wheel to rotate about the wheel pin within a trunnion wheel cavity defined by the trunnion wheel bracket and the equalizer bracket. The trunnion wheel unit is configured to be selectively connected and disconnected from the equalizer bracket to allow for a modular assembly.

These and other features of the trunnion assembly, and its associated methods and systems of use, are set forth in the claims that follow.

The invention claimed is:

1. A trunnion wheel assembly comprising:
   an equalizer bracket; and
   a trunnion wheel unit comprising a trunnion wheel bracket supporting a trunnion wheel that rotates within the trunnion wheel bracket;
   wherein the trunnion wheel unit is configured to be selectively connected and disconnected from the equalizer bracket;
   an equalizer support comprising a pivot mechanism pivotally connected to said equalizer bracket between opposite ends of the equalizer bracket,
   wherein the trunnion wheel unit is configured to be selectively connected and disconnected from the equalizer bracket without disassembling the pivot mechanism or the equalizer bracket;
   wherein:
      said equalizer bracket is positioned for support on a static surface and defines a clearing space between a first mating surface and a second mating surface; and
      said trunnion wheel bracket defines a corresponding clearing space between a first corresponding mating surface and a second corresponding mating surface;
      wherein said first mating surface and said second mating surface define respectively angled mating surfaces connected to said equalizer bracket;
      wherein said first corresponding mating surface and said second corresponding mating surface define respectively angled corresponding mating surfaces connected to said trunnion wheel bracket;
      wherein said respectively angled mating surfaces and respectively angled corresponding mating surfaces define respective angles relative to the static surface, such that, when connected, said respectively angled mating surfaces and respectively angled corresponding mating surfaces extend around a central axis of the trunnion wheel without intersecting the central axis of the trunnion wheel;

wherein said respectively angled mating surfaces selectively connect and disconnect from said respectively angled corresponding mating surfaces; and wherein in a connected position, said equalizer bracket and said trunnion wheel bracket meet at said respectively angled mating surfaces and respectively angled corresponding mating surfaces to define a trunnion wheel cavity encompassing the clearing space and the corresponding clearing space such that the trunnion wheel is exposed by a section of the trunnion wheel cavity opposite the equalizer bracket and rotates within the trunnion wheel assembly.

2. A trunnion wheel assembly according to claim 1, further comprising a wheel pin that is coaxial with said trunnion wheel and secured across the trunnion wheel bracket such that said trunnion wheel rotates within the trunnion wheel bracket and about the wheel pin.

3. A trunnion wheel assembly according to claim 2, further comprising a bearing assembly configured in a coaxial relationship between said wheel pin and said trunnion wheel.

4. A trunnion wheel assembly according to claim 2, wherein said trunnion wheel bracket defines a wheel pin passageway through opposite sides of the trunnion wheel bracket, said wheel pin passageway being coaxial with said wheel pin and said trunnion wheel.

5. A trunnion wheel assembly according to claim 1,
wherein the angled mating surfaces and corresponding angled mating surfaces configure the trunnion wheel assembly with a respective trunnion wheel unit selectively connected and disconnected at said pairs of mating surfaces at each of the opposite ends.

6. A trunnion wheel assembly according to claim 5, further comprising at least one removable fastener connecting said respective trunnion wheel units to said pairs of mating surfaces.

7. A trunnion wheel assembly according to claim 1, further comprising a support pivot pin connecting said equalizer support to said equalizer bracket such that the opposite ends have a range of motion along respective arcuate paths.

8. A trunnion wheel assembly according to claim 1 wherein said respective angles are right angles.

9. A trunnion wheel assembly comprising:
an equalizer bracket;
an equalizer support pivotally connected to said equalizer bracket between opposite ends of the equalizer bracket;
a trunnion wheel bracket defining a wheel pin passageway there through, said trunnion wheel bracket configured to selectively connect and disconnect from said equalizer bracket;
wherein:
said equalizer bracket is positioned for support on a static surface and defines a clearing space between a first mating surface and a second mating surface; and
said trunnion wheel bracket defines a corresponding clearing space between a first corresponding mating surface and a second corresponding mating surface;
wherein said first mating surface and said second mating surface define respectively angled mating surfaces connected to said equalizer bracket;

wherein said first corresponding mating surface and said second corresponding mating surface define respectively angled corresponding mating surfaces connected to said trunnion wheel bracket;

wherein said respectively angled mating surfaces and respectively angled corresponding mating surfaces define respective angles relative to the static surface, such that, when connected, said respectively angled mating surfaces and respectively angled corresponding mating surfaces extend around a central axis of the trunnion wheel without intersecting the central axis of the trunnion wheel;

wherein said respectively angled mating surfaces selectively connect and disconnect from said respectively angled corresponding mating surfaces; and wherein in a connected position, said equalizer bracket and said trunnion wheel bracket meet at said respectively angled mating surfaces and respectively angled corresponding mating surfaces to define a trunnion wheel cavity encompassing the clearing space and the corresponding clearing space such that the trunnion wheel is exposed by a section of the trunnion wheel cavity opposite the equalizer bracket and rotates within the trunnion wheel assembly, wherein the portion of the trunnion wheel that is exposed is configured to receive a load thereon at a plurality of angles determined by a pivot position of the equalizer support.

10. A trunnion wheel assembly according to claim 9, further comprising a wheel pin that fits within the wheel pin passageway of the trunnion wheel bracket such that the trunnion wheel rotates within the trunnion wheel bracket and about the wheel pin.

11. A trunnion wheel assembly according to claim 10, said wheel pin further comprising a bearing assembly that is coaxial with said trunnion wheel and said wheel pin passageway.

12. A trunnion wheel assembly according to claim 9, wherein said equalizer bracket defines pairs of mating surfaces at opposite ends of the equalizer bracket, and the trunnion wheel assembly further comprises a respective trunnion wheel bracket selectively connected and disconnected to said pairs of mating surfaces at each of the opposite ends such that the trunnion wheel assembly receives the trunnion wheel and a second trunnion wheel at said opposite ends of said equalizer bracket.

13. A trunnion wheel assembly according to claim 12, further comprising:
a pivot mechanism connecting said equalizer support to said equalizer bracket; and
at least one respective removable fastener connecting said respective trunnion wheel brackets to said pairs of mating surfaces,
wherein either of the respective trunnion wheel brackets are removable from the trunnion wheel assembly in the presence of a load on at least one of the trunnion wheel and the second trunnion wheel without removing the pivot mechanism.

14. A trunnion wheel assembly according to claim 9, further comprising a support pivot pin connecting said equalizer support to said equalizer bracket such that the opposite ends have a range of motion along respective arcuate paths about said support pivot pin.

15. A trunnion wheel assembly according to claim 9 wherein said respective angles are right angles.

16. A railcar dumper system comprising:
a rotary rail car dumper supported by at least four trunnion wheel assemblies, each trunnion wheel assembly comprising:
  an equalizer bracket;
  a pair of trunnion wheel units selectively connected and disconnected from opposite ends of the equalizer bracket, wherein each trunnion wheel unit comprises a respective trunnion wheel bracket supporting a respective trunnion wheel that rotates within the trunnion wheel bracket; and
  an equalizer support pivotally connected to said equalizer bracket between said opposite ends;
wherein:
  said equalizer bracket is positioned for support on a static surface and defines a clearing space between a first mating surface and a second mating surface; and
  said trunnion wheel bracket defines a corresponding clearing space between a first corresponding mating surface and a second corresponding mating surface;
  wherein said first mating surface and said second mating surface define respectively angled mating surfaces connected to said equalizer bracket;
  wherein said first corresponding mating surface and said second corresponding mating surface define respectively angled corresponding mating surfaces connected to said trunnion wheel bracket;
  wherein said respectively angled mating surfaces and respectively angled corresponding mating surfaces define respective angles relative to the static surface, such that, when connected, said respectively angled mating surfaces and respectively angled corresponding mating surfaces extend around a central axis of the trunnion wheel without intersecting the central axis of the trunnion wheel;
  wherein said respectively angled mating surfaces selectively connect and disconnect from said respectively angled corresponding mating surfaces; and
  wherein in a connected position, said equalizer bracket and said trunnion wheel bracket meet at said respectively angled mating surfaces and respectively angled corresponding mating surfaces to define a trunnion wheel cavity encompassing the clearing space and the corresponding clearing space such that the trunnion wheel is exposed by a section of the trunnion wheel cavity opposite the equalizer bracket and rotates within the trunnion wheel assembly.

17. A railcar dumper system according to claim 16, further comprising a support pivot pin connecting said equalizer support to said equalizer bracket such that the opposite ends have a range of motion along respective arcuate paths about said support pivot pin.

18. A railcar dumper system according to claim 16, wherein said trunnion wheels rotate in engagement with said rotary rail car dumper.

19. A rail car dumper system according to claim 16 wherein said respective angles are right angles.

* * * * *